United States Patent [19]
Gossett, Jr. et al.

[11] Patent Number: 5,264,019
[45] Date of Patent: Nov. 23, 1993

[54] COATING COMPOSITIONS FOR SLOW RELEASE FERTILIZER FORMULATIONS

[75] Inventors: John R. Gossett, Jr., Kingsport; Shane K. Kirk, Church Hill; E. Phillip Smith, Blountville, all of Tenn.

[73] Assignee: Eastman Kodak Company, Rochester, N.Y.

[21] Appl. No.: 664,719

[22] Filed: Mar. 5, 1991

[51] Int. Cl.$^5$ ................................ C05G 3/10
[52] U.S. Cl. .................. 71/64.07; 71/64.11; 71/64.13; 524/272; 524/476
[58] Field of Search ............... 71/64.11, 64.07, 64.13; 524/272, 476

[56] References Cited

U.S. PATENT DOCUMENTS

| | | | |
|---|---|---|---|
| 3,096,171 | 7/1963 | Woerther | 71/64 |
| 3,205,061 | 9/1965 | Mason | 71/28 |
| 3,372,019 | 3/1968 | Fox | 71/64 |
| 3,896,069 | 7/1975 | Kosaka et al. | 524/272 X |
| 3,903,333 | 9/1975 | Shirley et al. | 427/212 |
| 4,369,055 | 1/1983 | Fujita et al. | 71/64.11 |
| 4,657,576 | 4/1987 | Lambie | 71/64 |
| 4,886,853 | 12/1989 | Foster et al. | 524/476 X |
| 5,021,257 | 6/1991 | Foster et al. | 524/476 X |

FOREIGN PATENT DOCUMENTS 330331  8/1989  European Pat. Off. ........... 71/64.07

OTHER PUBLICATIONS

O. A. Salman, *Journal of Agricultural Food and Chemicals*, 36, pp. 616–621 (1988).

O. A. Salman, *Ind. Eng. Chem. Res.*, 28, pp. 630–632 (1989).

O. A. Salman, *Ind. Eng. Chem. Res.*, 28, pp. 633–638 (1989).

*Primary Examiner*—Ferris Lander
*Attorney, Agent, or Firm*—Betty J. James; T. R. Savitsky; William P. Heath, Jr.

[57] ABSTRACT

Coating compositions containing medium density, low molecular weight polyethylene wax and a tackifying resin. The coating composition coats a fertilizer core such as urea to result in an improved fertilizer release profile.

10 Claims, No Drawings

COATING COMPOSITIONS FOR SLOW RELEASE FERTILIZER FORMULATIONS

FIELD OF THE INVENTION

This invention relates to coating compositions containing a polyethylene wax for slow release fertilizer formulations.

BACKGROUND OF THE INVENTION

Nitrogen, potassium, and phosphorus are essential elements for plant growth, and commercially available fertilizers invariably contain one or more of these elements. Unfortunately most of the commercial fertilizers containing these elements are readily water soluble and this creates a number of disadvantages. In a heavy rainfall much of the fertilizer may be dissolved in the rainwater and soaked into the ground below the plant roots or rapidly transported away by flowing surface water. This fertilizer never becomes available to the plants. Another disadvantage is that the fertilizer often becomes available to the plant too rapidly resulting in injury to the plant rather than benefit. This is often noticed in "burned" lawns or crops. Thus, it would be desirable to have a fertilizer formulation that enhances slow release of the fertilizer.

The following prior art is of interest:

The article "Polymer Coating on Urea Prills to Reduce Dissolution Rate" by Omar A. Salman, *Journal of Agricultural Food and Chemicals*, 36, pp. 616-621 (1988) describes the need for slow release urea formulations and the process for producing low density polyethylene coated urea.

L. Woerther, U.S. Pat. No. 3,096,171 (1960) describes the process for producing slow release fertilizer formulations by coating granules with plant waxes.

J. C. Mason, Jr., U.S. Pat. No. 3,205,061 (1964) describes the process for producing slow release urea by dispersing urea in paraffin wax.

R. C. Fox, U.S. Pat. No. 3,372,019 (1968) describes the process for producing slow release fertilizer formulations by coating granules with a mixture of paraffin or microcrystalline wax and resin comprised of copolymers of ethylene and vinyl acetate.

A. R. Shirley and R. S. Meline, U.S. Pat. No. 3,903,333 (1975) describe the process for producing slow release urea by coating granules with molten sulfur.

J. M. H. Lambie, U.S. Pat. No. 4,657,576 (1987) describes the process for producing slow release fertilizers by coating granules with dicyclopentadiene/linseed oil.

None of the prior art references teach the use of medium density polyethylene wax in a fertilizer formulation.

SUMMARY OF THE INVENTION

We have found that use of coating compositions containing a medium density polyethylene wax and a tackifying resin as hereinafter described results in excellent slow release of fertilizers. More specifically, the present invention is directed to a coating composition comprising:

(A) about 75% to about 95% of a polyethylene wax having a molecular weight of about 2,000 to about 4,000, and a density of about 0.92 to about 0.94 g/ml, and (B) about 5% to about 25% of a tackifying resin comprising a hydrogenated C$_5$ hydrocarbon resin having a molecular weight of about 700 to about 1,200 and a Ring and Ball softening point of about 80° C. to about 150° C., said percentages being based on the total weight of components (A) and (B).

The present invention is also directed to a fertilizer composition comprising:

(1) a core fertilizer material comprising at least one soluble salt of nitrogen, potassium, or phosphorous, and (2) a coating composition surrounding said core wherein said coating composition comprises:

(A) about 75% to about 95% of a polyethylene wax having a molecular weight of about 2,000 to about 4,000, and a density of about 0.92 to about 0.94 g/ml, and (B) about 5% to about 25% of a tackifying resin comprising a hydrogenated C$_5$ hydrocarbon resin having a molecular weight of about 700 to about 1,200 and a Ring and Ball softening point of about 80° C. to about 150° C., said percentages being based on the total weight of components (A) plus (B).

DETAILED DESCRIPTION OF THE INVENTION

In the coating composition and fertilizer composition of the invention it is preferred that component (A) is present in an amount of about 80% to about 90% and component (B) is present in an amount of about 10% to about 20%. Most preferably the coating composition comprises about 80% of component (A) and about 20% of component (B). Also, in the fertilizer composition it is preferred that component (2) is present in an amount of about 5 to about 40%, based on the weight of component (1).

The polyethylene wax of the invention is a medium density polyethylene wax that can be prepared by techniques known in the art or is available commercially, for example, from Eastman Chemical Products, Inc., Kingsport, Tenn., U.S.A. Such waxes can be made by direct synthesis or by degrading polyethylene to the desired molecular weight. Examples of commercially available waxes useful herein include Epolene N 10, N 11, and N 12, available from Eastman Chemical Products, Inc. The polyethylene wax useful herein preferably has a molecular weight of about 2,500 to about 3,500. Additionally, the polyethylene wax preferably has a density of about 0.925 g/ml. Density can be determined by ASTM Procedure D 1505-68.

The tackifying resin useful herein can be prepared by techniques known in the art or is commercially available. The tackifiers useful herein can be hydrocarbon resins such as DAC B hydrocarbon resin prepared according to the process disclosed in U.S. Pat. No. 3,701,760 as well as other hydrocarbon resins, polyterpenes, and the like. One such hydrocarbon tackifying resin is a hydrocarbon resin having a softening point of about 100° C. and available commercially as Eastotac H-100 from Eastman Chemical Products, Inc. Other hydrocarbon tackifying resins can be prepared by the polymerization of monomers consisting primarily of olefins and diolefins and include, for example, the residual by product monomers resulting from the manufacture of isoprene. Examples of such commercially available resins based on a C$_5$-olefin fraction of this type are "Wingtack" 95 and "Wingtack" 115 tackifying resins sold by Goodyear Tire and Rubber Company, the Sta-Tac and Betaprene A or H resins sold by Reichhold Chemical Corporation, and Escorez resins sold by Exxon Chemical Company. Also, other suitable tackifier resins are the terpene polymers such as the polymeric, resinous materials obtained by polymerization and/or copolymerization of terpene hydrocarbons such as the alicyclic, monocyclic, and bicyclic monoterpenes and their mixtures, including alloocimene, carene, isomerized pinene, pinene, dipentene, terpinene, terpinolene, limonene, terpentine, a terpene cut or fraction, and various other terpenes. Particularly useful starting materials are terpene mixtures containing at least 20 percent beta-pinene and/or limonene or dipentene (racemic limonene), and the "sulfate terpentine" obtained as a by-product in the sulfate pulping process. Commercially available resins of the terpene type include Zonarez terpene B-series and 7000 Series resins from Arizona Chemical Corporation and Nirez resins from Reichhold Chemical Corporation. It is preferred that the tackifying resin has a molecular weight of about 800 to about 1,000, more preferably about 850 to about 1,025, and a Ring and Ball softening point of about 90° C. to about 140° C., more preferably about 100° C. to about 130° C.

The coating composition of the invention optionally comprises about 1 to about 50%, based on the total weight of the coating composition, of at least one additional additive. Examples of such additional additives include talc, $TiO_2$, $CaCo_3$, and the like.

The fertilizer useful herein comprises at least one soluble salt of nitrogen, potassium, or phosphorous. Examples include urea, ammonium nitrate, potassium chloride, sodium nitrate, potassium phosphate, monoammonium phosphate, diammonium phosphate, potassium sulfate, calcium cyanide, potassium nitrate, superphosphate (a mixture of calcium acid phosphate and calcium sulfate), and triple superphosphate (calcium acid phosphate). Urea is a preferred source of nitrogen because it contains a higher percentage of nitrogen than the other nitrogen fertilizer compounds mentioned.

The coating composition of the invention can be prepared by techniques known in the art and/or as taught herein. For example, the polyethylene wax and tackifying resin are mixed in the presence of a suitable solvent such as xylene at about 75° C. to about 90° C. in a conventional mixer such as a Lightnin ® stirrer until a substantially homogeneous coating is obtained. Such mixing will depend on the particular equipment employed and other conditions such as temperature; however, a mixing time of about 30 minutes to about 60 minutes is typically sufficient.

The fertilizer composition of the invention can be prepared by techniques known in the art and/or as taught herein. For example, prills of fertilizer are coated with the coating composition by use of conventional coating equipment such as an air suspension coater. A volatile organic solvent such as xylene can be employed to solubilize the coating composition in order to facilitate the coating operation. The temperature for the coating operation typically varies from about 65° C. to about 120° C. The coating procedure is carried out for a time sufficient to achieve the desired level of coating, typically about lo minutes to about 30 minutes.

The fertilizer compositions of the invention result in a greatly improved fertilizer release profile as compared with prior art compositions. For example, when the fertilizer composition of the invention is extracted with distilled water at ambient temperature for one day, typically less than about 15% of the fertilizer is released, preferably less than about 10%, and more preferably less than about 8%.

The following examples are to illustrate the invention but should not be interpreted as a limitation thereon.

EXAMPLE 1 (Comparative)

This example illustrates the poor slow release characteristics of urea prills coated with sulfur. The sample tested was taken from Scotts Proturf ®. A sample of coated prills (one gram) was extracted in 500 mL of distilled water for 37 days. The extract was assayed for urea content on a Roche COBAS BIO analyzer using Sigma BUN(RATE) reagent. The effect of 37 days exposure in distilled water is shown in the following table.

| Time in Distilled Water (Days) | % of Urea Released |
|---|---|
| 1 | 46 |
| 2 | 63 |
| 4 | 74 |
| 7 | 74 |
| 9 | 77 |
| 14 | 77 |
| 22 | 82 |
| 37 | 88 |

EXAMPLE 2 (COMPARATIVE)

This example illustrates the poor slow release characteristics of urea prills coated with polyethylene wax with a molecular weight of 3,000 and a density of 0.925 g/mL without a tackifying resin when immersed in distilled water.

In an air suspension coater, 200 grams of urea prills were coated with 17.4 grams of medium density, low molecular weight, polyethylene wax from 350 grams of warm xylene. Using the same procedure as that in Example 1, a sample of coated prills was extracted in distilled water for three days. The results are shown in the following table.

| Time in Distilled Water (Days) | % of Urea Released |
|---|---|
| 1 | 24 |
| 2 | 42 |
| 3 | 57 |

EXAMPLE 3 (COMPARATIVE)

This example illustrates the release characteristics of urea coated with dicyclopentadiene/linseed oil. The sample tested was taken from Sierra Chemical Company Osmocote TM. Using the same procedure as that in Example 1, a sample of coated prills was extracted in distilled water for 43 days. The results are shown in the following table.

| Time in Distilled Water (Days) | % of Urea Released |
|---|---|
| 1 | 14 |
| 2 | 15 |
| 5 | 19 |
| 9 | 25 |
| 19 | 46 |
| 30 | 67 |

-continued

| Time in Distilled Water (Days) | % of Urea Released |
| --- | --- |
| 33 | 73 |
| 37 | 78 |
| 40 | 80 |
| 43 | 82 |

EXAMPLE 4

This example illustrates the addition of 20% of the hydrogenated $C_5$ hydrocarbon tackifying resin with a Ring and Ball softening point of 100° C. to improve the slow release characteristics of coated urea prills.

Using the same conditions as in Example 2, urea prills were coated with 17.4 grams of polyethylene wax as described in Example 2 and 4.4 grams of tackifying resin from 350 grams of warm xylene. Using the same procedure as that in Example 1, a sample of coated prills was extracted in distilled water for 72 days. The results are shown in the following table.

| Time in Distilled Water (Days) | % of Urea Released |
| --- | --- |
| 1 | 6 |
| 2 | 9 |
| 3 | 13 |
| 4 | 14 |
| 10 | 24 |
| 21 | 35 |
| 28 | 38 |
| 35 | 42 |
| 39 | 44 |
| 44 | 48 |
| 49 | 50 |
| 56 | 55 |
| 72 | 64 |

Coated prills from Example 4 show a very significant improvement in the slow release profile compared to that for Example 2 and superior to that for Examples 1 and 3 also.

EXAMPLE 5 (COMPARATIVE)

This example illustrates the addition of 30% of the hydrogenated $C_5$ hydrocarbon tackifying resin with a Ring and Ball softening point of 100° C. to the coating formulation.

Using the same conditions as in Example 2, urea prills were coated with 15.3 grams of medium density, low molecular weight polyethylene wax and 6.5 grams of tackifying resin from 350 grams of warm xylene. The coating could not be completed due to severe agglomeration during the process.

EXAMPLE 6

This example illustrates the addition of 10% of the hydrogenated $C_{50}$ hydrocarbon tackifying resin with a Ring and Ball softening point of 100° C. to the coating formulation.

Using the same conditions as in Example 2, urea prills were coated with 19.6 grams of medium density, low molecular weight polyethylene wax and 2.2 grams of tackifying resin from 350 grams of warm xylene. Using the same procedure as that in Example 1, a sample of coated prills was extracted in distilled water for 22 days. The results are shown in the following table.

EXAMPLE 7

This example illustrates the addition of 5% of the hydrogenated $C_5$ hydrocarbon tackifying resin with a Ring and Ball softening point of 100° C. to the coating formulation.

Using the same conditions as in Example 2, urea prills were coated with 20.7 grams of medium density, low molecular weight polyethylene wax and 1.1 grams of tackifying resin from 350 grams of warm xylene. Using the same procedure as that in Example 1, a sample of coated prills was extracted in distilled water for 11 days. The results are shown in the following table.

| Time in Distilled Water (Days) | % of Urea Released |
| --- | --- |
| 1 | 11 |
| 2 | 33 |
| 3 | 51 |
| 4 | 63 |
| 7 | 69 |
| 9 | 82 |
| 11 | 85 |

EXAMPLE 8 (COMPARATIVE)

This example illustrates the addition of 20% of the hydrogenated $C_5$ hydrocarbon tackifying resin with a Ring and Ball softening point of 100° C. to the coating formulation containing medium density polyethylene with a molecular weight of 1800 (low molecular weight).

Using the same conditions as in Example 2, urea prills were coated with 17.4 grams of medium density, low molecular weight polyethylene wax and 4.4 grams of tackifying resin from 350 grams of warm xylene. The coating could not be completed due to severe agglomeration during the process.

EXAMPLE 9 (COMPARATIVE)

This example illustrates the addition of 20% of the hydrogenated $C_5$ hydrocarbon tackifying resin with a Ring and Ball softening point of 100° C. to the coating formulation containing low molecular weight polyethylene wax with a density less than 0.92 g/mL.

Using the same conditions as in Example 2, urea prills were coated with 17.4 grams of low density, low molecular weight polyethylene wax and 4.4 grams of tackifying resin from 350 grams of warm xylene. The coating could not be completed due to severe agglomeration during the process.

EXAMPLE 10

This example illustrates the addition of 20% of the hydrogenated $C_5$ hydrocarbon tackifying resin with a Ring and Ball softening point of 130° C. to the coating formulation containing medium density, low molecular weight polyethylene wax.

Using the same conditions as in Example 2, urea prills were coated with 17.4 grams of medium density, low molecular weight polyethylene wax and 4.4 grams of tackifying resin from 350 grams of warm xylene. Using the same procedure as that in Example 1, a sample of coated prills was extracted in distilled water for 12 days. The results are shown in the following table.

| Time in Distilled Water (Days) | % of Urea Released |
| --- | --- |
| 1 | 16 |
| 4 | 46 |
| 6 | 60 |
| 8 | 69 |
| 12 | 72 |

The invention has been described in detail with particular reference to preferred embodiments thereof, but it will be understood that variations and modifications can be effected within the spirit and scope of the invention.

We claim:

1. A fertilizer composition comprising:
   (1) a core fertilizer material comprising at least one soluble salt of nitrogen, potassium, or phosphorous, and
   (2) a coating composition surrounding said core wherein said coating composition comprises:
     (A) about 75% to about 95% of a polyethylene wax having a molecular weight of about 2,000 to about 4,000, and a density of about 0.92 to about 0.94 g/ml, and
     (B) about 5% to about 25% of a tackifying resin consisting of a hydrogenated $C_5$ hydrocarbon resin having a molecular weight of about 700 to about 1,200 and a Ring and Ball softening point of about 80° C. to about 150° C.,
   said percentages being based on the total weight of components (A) plus (B).

2. The fertilizer composition of claim 1 wherein said core is comprised of urea.

3. The fertilizer composition of claim 1 wherein component (2) is present in an amount of about 5 to about 40%, based on the weight of component (1).

4. The fertilizer composition of claim 1 wherein component (A) is present in an amount of about 80% to about 90% and component (B) is present in an amount of about 10% to about 20%.

5. The fertilizer composition of claim 1 wherein said polyethylene wax has a molecular weight of about 2,500 to about 3,500 and said tackifying resin has a molecular weight of about 800 to about 1,000 and a Ring and Ball softening point of about 90° C. to about 140° C.

6. The fertilizer composition of claim 1 wherein said polyethylene wax has a density of about 0.925 g/ml.

7. The fertilizer composition of claim 6 wherein said tackifying resin has a molecular weight of about 850 to about 1,025 and a Ring and Ball softening point of about 100° C. to about 130° C.

8. The fertilizer composition of claim 7 comprising about 80% of component (A) and about 20% of component (B).

9. The fertilizer composition of claim 1 wherein said tackifying resin has a molecular weight of about 850 to about 1,025 and a Ring and Ball softening point of about 100° C. to about 130° C.

10. The fertilizer composition of claim 1 wherein said coating composition further comprises about 1 to about 50%, based on the total weight of the coating composition, of at least one additional additive selected from the group consisting of talc, $TiO_2$, and $CaCO_3$.

* * * * *

UNITED STATES PATENT AND TRADEMARK OFFICE
CERTIFICATE OF CORRECTION

PATENT NO. : 5,264,019
DATED : November 23, 1993
INVENTOR(S) : John R. Gossett, Jr. et al It is certified that error appears in the above-indentified patent and that said Letters Patent is hereby corrected as shown below:

Column 7, line 17 (claim 1), "comprising" should be ---consisting of---.

Column 7, line 28 (claim 1), "consisting of" should be ---comprising---.

Signed and Sealed this

Eleventh Day of April, 1995

Attest:

BRUCE LEHMAN

Attesting Officer

Commissioner of Patents and Trademarks